July 10, 1951
O. CARLSON
2,559,939
CRADLE ROCKING SPRING MECHANISM
Filed March 5, 1948
4 Sheets-Sheet 1
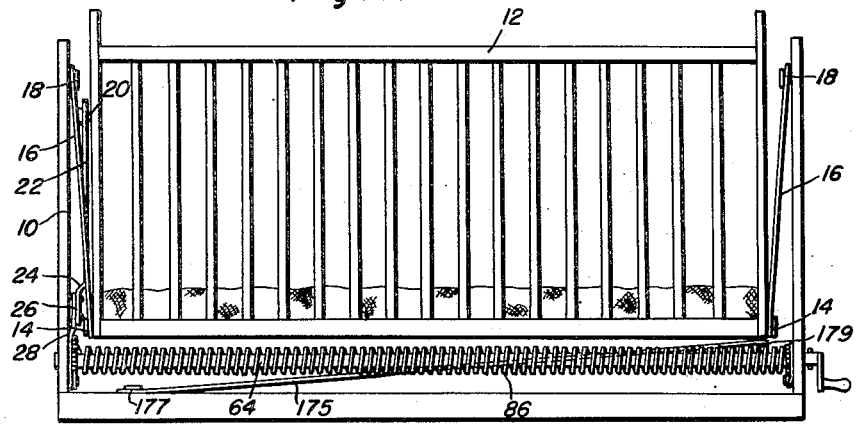
Fig. 1.
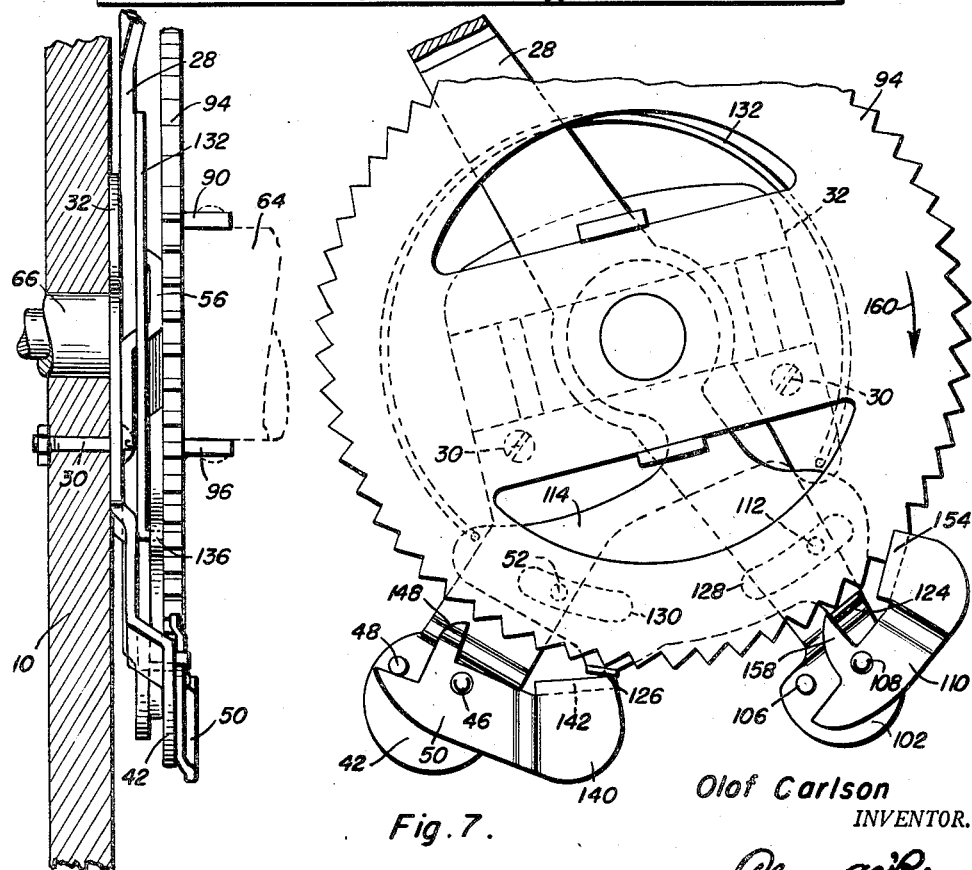
Fig. 6.
Fig. 7.
Olof Carlson
INVENTOR.
BY Clarence A. O'Brien
and Harvey B. Jacobson
Attorneys July 10, 1951     O. CARLSON     2,559,939
CRADLE ROCKING SPRING MECHANISM
Filed March 5, 1948     4 Sheets-Sheet 2
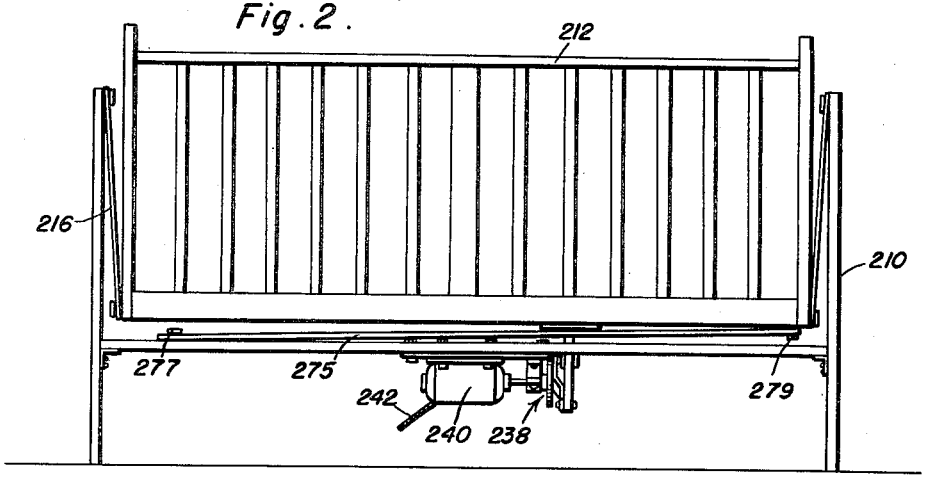
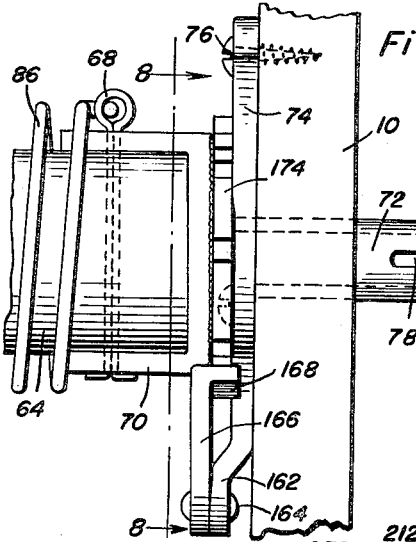
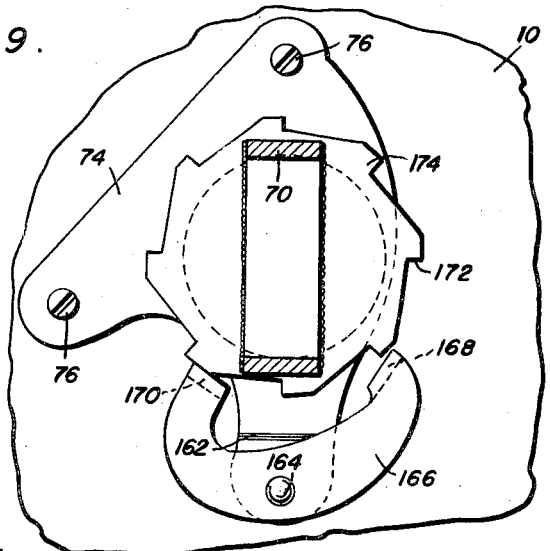
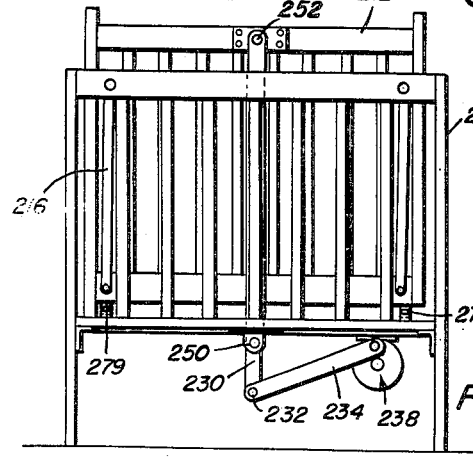
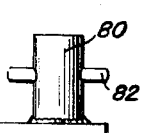
Olof Carlson
INVENTOR.
BY *Clarence A. O'Brien*
*and Harvey B. Jacobson*
Attorneys July 10, 1951  O. CARLSON  2,559,939
CRADLE ROCKING SPRING MECHANISM
Filed March 5, 1948  4 Sheets-Sheet 3

Olof Carlson
INVENTOR.

BY Clarence A. O'Brien
and Harvey B. Jackson
Attorneys

July 10, 1951  O. CARLSON  2,559,939
CRADLE ROCKING SPRING MECHANISM
Filed March 5, 1948  4 Sheets-Sheet 4

Olof Carlson
INVENTOR.

BY Clarence A. O'Brien
and Harvey B. Jacobson
Attorneys

Patented July 10, 1951

2,559,939

UNITED STATES PATENT OFFICE 2,559,939

CRADLE ROCKING SPRING MECHANISM

Olof Carlson, Winter Park, Fla.

Application March 5, 1948, Serial No. 13,175

2 Claims. (Cl. 185—38)

This invention comprises novel and useful improvements in a cradle rocking spring mechanism and more specifically pertains to a nursery cradle having a spring actuating mechanism for rocking the same.

The principal object of this invention is to provide a nursery cradle together with means for automatically rocking the same.

An important feature of the invention resides in the provision of a nursery cradle having a supporting frame and a bed swingingly mounted therein, together with mechanism for automatically swinging or rocking the cradle.

A further feature of the invention resides in the provision of a cradle as set forth in the preceding paragraph wherein there is provided a novel construction of spring motor for actuating the cradle.

A further feature of the invention resides in the provision of a mechanism as hereinbefore set forth wherein a novel and improved means is provided for mounting the actuating mechanism upon the cradle; and for converting the energy of a coiled spring into controlled, timed impulses for rocking the cradle.

A still further feature of the invention is to provide an apparatus in conformity with the foregoing objects and features wherein there is provided an improved escapement mechanism for controlling the delivery of energy stored in the coil spring to the rocking mechanism of the cradle.

And a final important object and feature of the invention to be specifically enumerated herein resides in the provision of a compact, dependable and durable spring operated rocking cradle.

These, together with various ancillary features and objects of the invention which will later become apparent as the following description proceeds, are attained by this device, preferred embodiments of which have been illustrated by way of example only in the accompanying drawings, wherein:

Figure 1 is a side elevational view showing the preferred embodiment of the invention applied to a cradle;

Figure 2 is a side elevational view of a modification of the invention showing an electric motor actuating means supplied to a cradle;

Figure 5 is an end elevational view similar to Figure 4, but showing a still further arrangement of an electric motor actuating mechanism for a cradle;

Figure 6 is a fragmentary vertical sectional view through the embodiment of Figure 1 and illustrating a portion of the escapement mechanism of the spring operating means for the cradle;

Figure 7 is an elevational view taken from the right of Figure 6 and further illustrating the construction and arrangement of the escapement mechanism thereof;

Figure 8 is a vertical transverse sectional view taken substantially upon the plane of the section line 8—8 of Figure 9 and showing the winding ratchet of the spring mechanism;

Figure 9 is a fragmentary side elevational view of the winding mechanism, spring mounting and crank socket of the arrangement of Figure 1;

Figure 10 is a side elevational view of a crank which may be employed for winding the spring of the embodiment of Figure 1;

Figure 3:
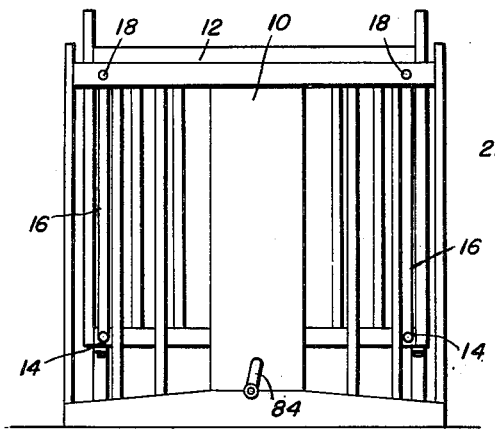
Figure 3 is an end elevational view taken from the right hand of Figure 1.

Referring now more specifically to the accompanying drawings, wherein like numerals designate similar parts throughout the various views, attention is directed first to the modification shown in Figures 1, 3, 6–15. In this, the preferred embodiment of the invention, there is disclosed a nursery crib comprising a stationary supporting frame 10 of any suitable construction upon which is hung and swingably mounted a crib 12 likewise of any desired type. The crib 12 may be suitably mounted for swinging or rocking movement upon the support 10 as by means of supporting pins 14 which are positioned at the bottom end of the two end portions of the crib 12, and which are journalled upon supporting links 16 at the lower extremities thereof, these links being pivotally connected at their upper ends as at 18 to the upper portions of the end members of the stationary supporting frame 10. The arrangement is such that the crib may be rocked or swung from side to side of the supporting frame 10, and by reason of the parallel supporting links 16, will have its bed portion always disposed in a horizontal plane throughout its swinging movement.

At what may be termed the crank end of the crib, there is provided a clock-work or spring motor mechanism having an escapement movement for imparting a swinging motion to the crib. For this purpose, at the motor end of the crib, and preferably upon the vertical center line of the end member thereof, there is provided a crank pin 20 upon which is loosely received the longitudinally slotted end of a crank member 22 which at its lower end is provided with an offset portion 24 having an extremity 26 which is detachably but rigidly secured to the end of a crank lever 28.

The particular construction of the member 22 and its slot, is not shown, since this is of conventional design and in itself forms no part of the invention. The crank lever 28 forms a part of the clock-work or spring motor mechanism to be subsequently described.

Figure 11:
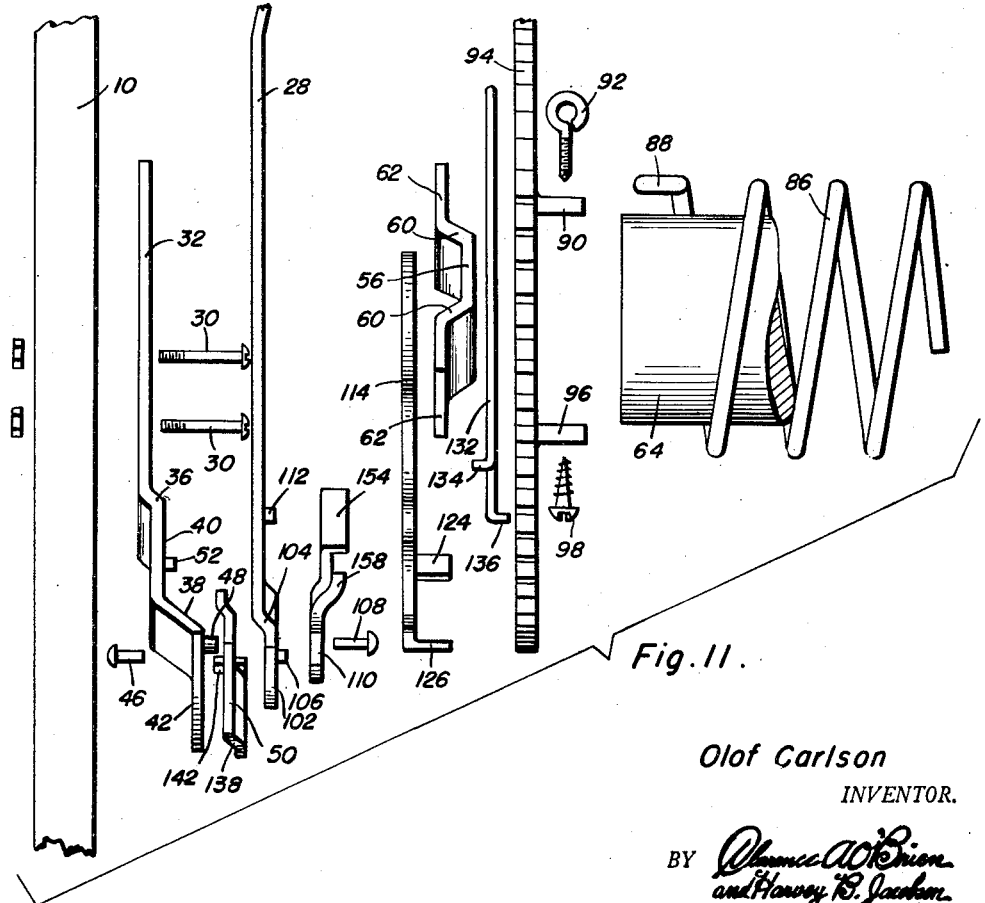
Figure 11 is a group assembly view of the escapement mechanism and the associated parts of the arrangement of Figure 1.
Figure 13:
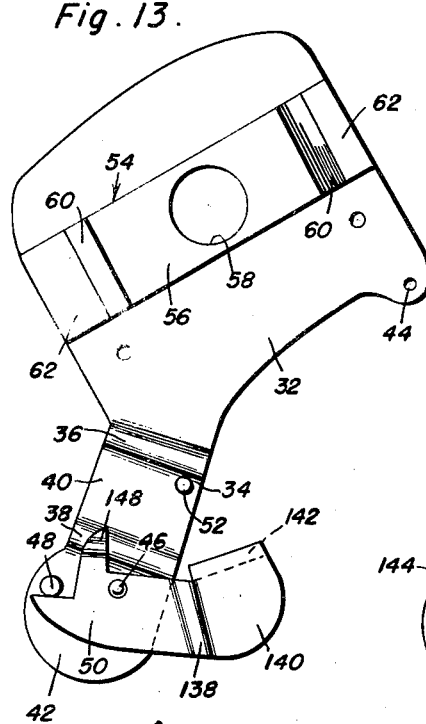
Figure 13 is a front elevational view of a stationary plate, bracket and escapement dog forming a part of the escapement mechanism.

Rigidly secured as by means of fastening bolts 30, see Figures 7 and 11, is a stationary plate 32 which if desired, may conveniently be of a generally square shape and having one corner extended diagonally as at 34 to provide a stationary arm. As shown best in Figure 11, this arm is provided at its extremity with a pair of angular turns or portions 36 and 38 respectively joined by a central portion 40 which is parallel to the plate 32, the angular portion 38 terminating in a portion 42 which is rounded at its lower end and is parallel to the portions 40 and 32. An adjacent corner of the plate 32 is provided with an aperture 44 for a purpose to be later set forth. The portion 42 is provided with a pair of laterally spaced pins 46 and 48, constituting respectively fulcrum and stop pins for a dog 50 to be later described.

The extension 34 is further provided with a stop pin 52 whose function will be set forth hereinafter.

Suitably attached to the surface of the plate 32, and rigidly secured thereto as by welding or in any other desired manner, is a supporting bracket 54 having a central flattened portion 56, disposed parallel and overlying the plate 32 but spaced therefrom, and provided with a central aperture 58. The central portion 56 is provided with downwardly turned legs 60 which terminate in laterally extending members 62 which are secured to the surface of the plate 32. The plate 32, the extension 34 and the bracket 54 attached thereto constitute a stationary mounting for securing the spring motor and its escapement mechanism to the supporting frame 10.

Extending longitudinally of the supporting frame and upon the longitudinal center line thereof is a roll or arbor 64 of wood or other suitable material, which at one end is provided with a pintle 66 for journalling the roller in the aperture 58 of the bracket 54, while the other end of the roller has secured thereto as by a cotter pin 68 or equivalent fastening means, a U-shaped bracket 70 whose arms embrace the ends of the roller 64 and which is provided with an extension 72 positioned axially of the roller 64, and which extension extends through and is journalled in a supporting bracket 74 detachably secured as at 76 to the crank end of the supporting frame 10, the extension 72 extending through the end of the frame and being provided with a diametrical slot or groove 78 for receiving a crank pin 80 having a tongue 82 receivable in the groove 78, and a handle 84 whereby the drum or roller may be rotated. A coil spring 86 has one end anchored in the eye of the cotter pin 68, and surrounds the arbor or roller 64, and has its other extremity provided with an eye 88 which is detachably secured to a lug 90 as by means of a fastening screw 92, which lug extends laterally from a ratchet gear 94. The latter is provided with a second lug 96 parallel to the lug 90, for receiving therebetween the end of the roller 64, the lugs being secured to the rollers by the above mentioned fastening screw 92 and a further screw 98. Thus, it will be seen that the roller 64 and the ratchet wheel 94 are rotatable by means of the tortion of the coil spring 86 as set forth hereinafter.

To transmit the motion of the ratchet wheel 94 to the crib 12 for swinging movement thereof, there is provided a clock-work or ratchet mechanism to be now described. This mechanism in addition to the stationary member 62, includes the previously mentioned lever 28 which has an enlarged central portion 100 suitably apertured for rotatable mounting upon the above mentioned pintle 66. This enlarged portion is disposed underneath the bracket 56 and upon the plate 32, for oscillatory movement within the confines of the bracket legs 60. At its upper end, the lever 28 is fastened as above mentioned by suitable means to the crank 24 whereby upon oscillation of the lever 28, the crank arm 22 is oscillated, thus causing a swinging movement of the crib 12, upon its spring metal or other resilient supporting straps 16, with a pivotal movement about the supporting pins 18 and 14.

At its lower end, the lever 28 is provided with a parallel, laterally offset extremity portion 102, which is connected with the lever as by the angular portion 104. A pair of spaced lateral pins 106 and 108 are provided upon the end portion 102, constituting respectively stop pins and fulcrums for a movable dog 110 whose construction will be referred to hereinafter.

Extending laterally from the lower portion of the lever 28 is a stop pin 112 similar in function to the stop pin 52 on the extension 34, and whose operation will be later set forth.

Figure 15:
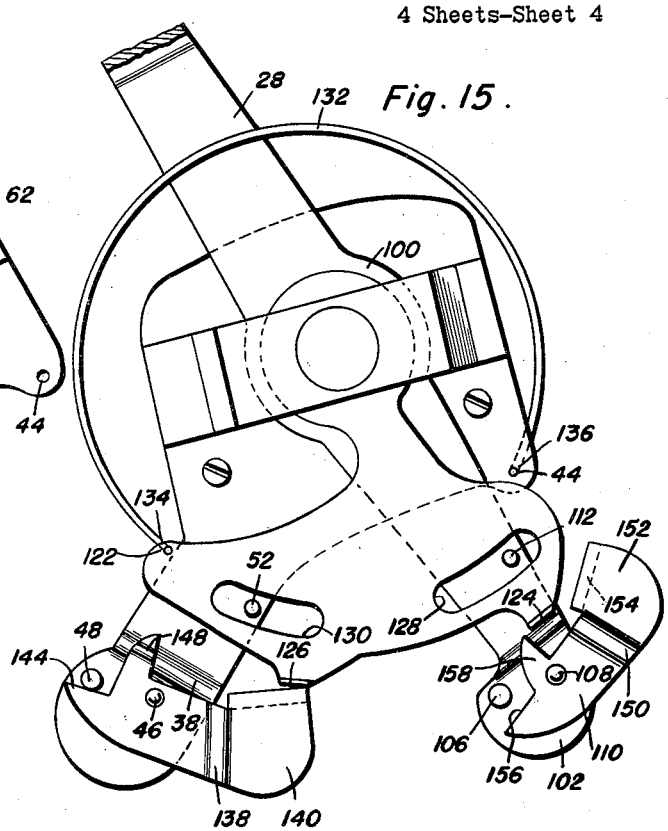
Figure 14:
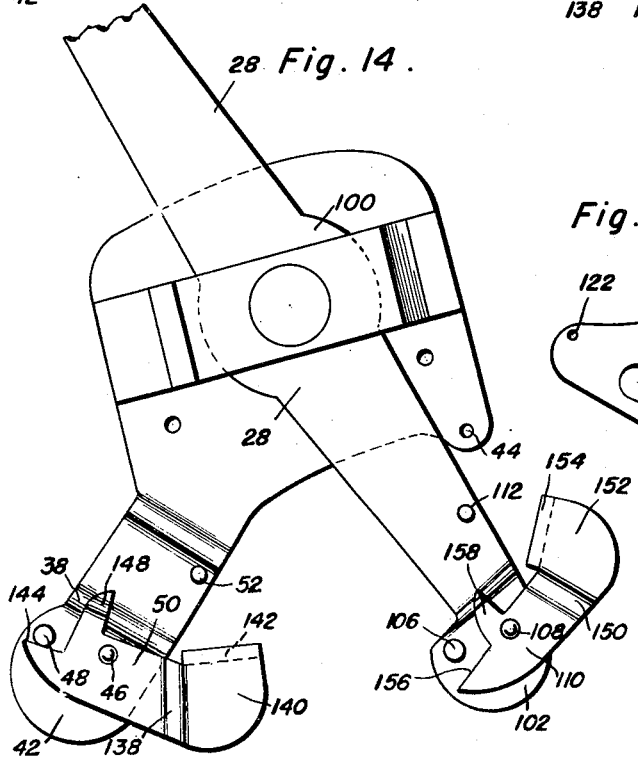
Figure 14 is a view similar to Figure 13 but showing the movable lever and its dog forming a part of the escapement mechanism and mounted upon the sub-assembly of Figure 13; and, Figure 15 is a view similar to Figure 14 but further showing the mounting in assembled position of the operating plate of Figure 12, mounted upon the sub-assembly of Figure 14.
Figure 12:
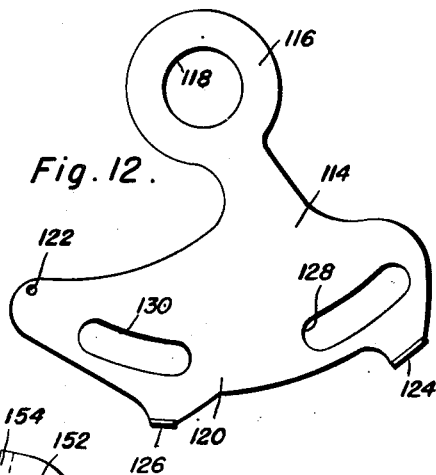
Figure 12 is a front elevational view of an operating plate forming a part of the escapement mechanism.

Likewise, freely and rotatably mounted upon the pintle 66 and immediately adjacent the undersurface of the portion 56 of the bracket 54, is an operating plate or escapement plate 114, having an annular upper end 116 provided with a journalling aperture 118 by which the plate is mounted upon the pintle, and having an arcuately shaped enlarged lower end 120. Adjacent one end, the lower end is provided with an aperture 122 and as shown in Figures 11 and 12, is provided at its radially lowermost edge with lateral flanges 124 and 126. A pair of arcuate slots 128 and 130 are provided in the plates 114 upon a common radius from the center of the aperture 118, and these slots are adapted to receive the stop pins 112 and 52 respectively, as shown in Figures 7 and 15. An arcuate wire spring 132 is provided having its extremities perpendicularly disposed as at 134 and 136 respectively engageable respectively in the apertures 44 and 122, for resiliently urging the members 34 and 28 apart from each other at their lower ends.

As will be seen from the sectional view of Figure 6, the ratchet wheel 94 overlies the fixed arm 34 and the movable lever arm 28, but by reason of the offset portions 36, 38 and 104, the extremities 42 and 102 are positioned radially outwardly of the ratchet wheel, whereby the dogs 50 and 110 may be selectively engaged with the ratchet wheel to act as escapement pawls therefor.

For this purpose, the dog 50 is provided with an offset portion 138 terminating in an extremity 140. The latter is provided with an angularly disposed flange 142 which is appropriately shaped and positioned for selected engagement with the teeth of the ratchet wheel 94 as set forth hereinafter.

At its other end, the dog is provided with a cut-away or shouldered portion 144 which constitutes a stop that is selectively engageable with the stop pin 48, and with an upwardly and inwardly curved finger 146. The latter is appropriately shaped for engagement by the flange or lug 126 on the escapement plate 114 as set forth hereinafter.

The dog 110 is similarly formed, and an angularly disposed portion 150 terminating in an end portion 152 having an outwardly turned flange 154 likewise engageable selectively with the teeth of the ratchet wheel. At its other end, this dog likewise is provided with a shoulder portion 156 constituting a stop for engagement with the stop pin 106, and with an upwardly and angularly disposed finger 158 likewise engageable with the flange 124 of the plate 114.

The parts are so proportioned and assembled that they operate as follows. The ratchet wheel 94, which rotates in the direction of the arrow 160 of Figure 7, is assumed to be placed under the tension of the wound spring 86 which may be placed under tension or tortion in a manner to be set forth hereinafter. It is understood that the wire spring 132 is pre-set and constantly under tension, being anchored as at 144 upon the stationary member 32, and applying a tension by means of the aperture 122 to the escapement plate 114, thereby yieldingly urging the latter in a clockwise direction. This clockwise urging of the escapement plate causes the flange or lug 124 to engage the finger 158, and thereby pivot the dog 110 into position to engage the flange 154 with the teeth of the ratchet wheel. Consequently, the dog is temporarily locked to the ratchet wheel, and as the latter rotates in the direction of the arrow 160, the dog, and the lever arm 28 are rotated in a clockwise direction therewith, the lever 28 through the lever arm 22 causing a swinging movement of the cradle 12 in one direction.

The ratchet wheel 94, the dog 110 and the lever 28 attached thereto now rotate as a unit in a clockwise direction as viewed in Figure 7, while the escapement plate 114 is temporarily stationary, being held by the resilience of the spring 132. During the first part of this movement, the stop pin 112 upon the lever 28 rides in the slot 128 until the same reaches the end of the slot, whereupon the escapement plate is likewise rotated in a clockwise direction with the previously mentioned elements. During this movement of the escapement plate, the slot 130 thereof travels across the stop pin 52 in the stationary arm 34, until the end of the slot is reached, whereupon the stop pin causes a cessation of the counterclockwise movement of the escapement plate. At this time, the crank arm 28 has now reached the substantial limit of its movement, the crib is at the top of its swing to one side, and is now ready to start its return movement, and it is desirable to disengage the driving pawl 110 from the ratchet wheel. Immediately prior to this final position, the flange or lug 126 on the escapement plate engages the finger 148 of the dog 50, thereby pivoting the latter in a counter-clockwise movement about its fulcrum 46, and causing the flange or pawl 142 thereof to engage the teeth of the escapement wheel, thereby locking the latter from further clockwise rotation. When the pawl 142 has become engaged with the ratchet wheel, the tension of the spring applied to the ratchet wheel is now directly applied to the dog 50, thus releasing the force applied to dog 110, whereupon the latter now pivots in a clockwise direction and disengages from the ratchet teeth. The return swing of the cradle 12 which is at the top of its stroke or position, imparted through the crank mechanism to the crank lever 28, now causes the latter to rotate in a counter-clockwise direction, thus returning the dog 110 to its original position. As the crank lever 28 moves counterclockwise, the tension of the spring 132 causes the escapement plate 114 to follow the same, and as will be readily seen from an inspection of Figure 15, the additional return movement of the lever 28 causes the stop pin 112 to engage the other end of the slot 128, whereby the dog 110 is free to pivot in a clockwise direction and disengage the pawl 154 from the teeth of the ratchet. The cradle thus makes its swing in the opposite direction; and when it is at the top of the swing, the counter-clockwise movement of the escapement plate 140 has been stopped by the engagement of the end of the slot 130 with the stop pin 52, whereby the finger 158 engages the flange 124 causing the pawl 154 to again engage the ratchet teeth, while the pawl or dog 50 now disengages and permits the ratchet to again rotate and impart another driving stroke to the crib. Obviously, this operation which is analogous to that of the escapement mechanism of a clockwork or watch movement, continues to oscillate or swing the crib as long as there is tension stored in the spring 86.

In order to tension the latter, the crank 80, 82 and 84 of Figure 10 is inserted in the end of the extension 72, and rotated, thereby twisting and tensioning the spring 86. This tension is maintained by a ratchet mechanism, disclosed in Figures 8 and 9.

For this purpose, the plate 74 is provided with an escapement extension which is angularly offset as at 162 and to which is pivoted as at 164 a pawl 166 of a generally arcuate shape and having inturned flanges 168 and 170 at its extremities. These flanges are alternately engageable with the ratchet teeth 172 of a plate 174 suitably secured to the bracket member 70. The ratchet teeth being stationary, as the roller 64, the member 70 and the plate 174 are rotated by cranking the spring shaft or arbor as above mentioned, the ratchet teeth are over on the pawl flanges 168 and 170. But return motion is prevented, since the flanges will respectively engage the appropriately shaped teeth 172. Thus, when the spring is wound, its torsion is maintained until released by operation of the escapement movement at the other end, with a resultant rocking movement of the cradle.

From the foregoing, the manner of operating and constructing this mechanism will be readily understood and further explanation is believed to be unnecessary.

Figure 4:
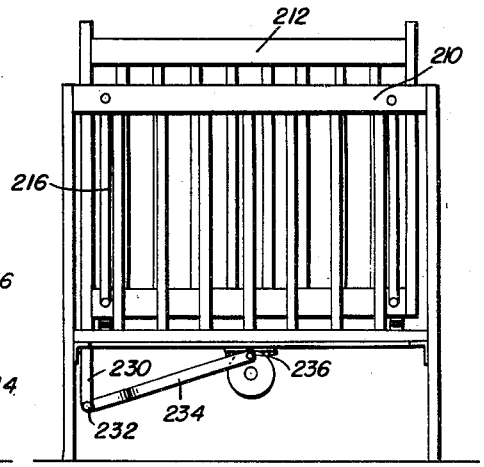
Figure 4 is an end elevational view taken from the right end of Figure 2.

Attention is now directed to Figures 2 and 4 for a description of the modified construction of cradle wherein the spring motor mechanism may be replaced by an electric motor, whch in some instances, will be preferable.

In this embodiment, a crib of similar construction as that previously described, including the stationary supporting frame 210 and the crib 212 oscillatably and swingably mounted therein as by the fastening straps 216, is provided at one side with a downwardly extending operating strap 230 which is pivotally connected as at 232 to the end of a connecting rod 234, whose other end is pivoted as at 236 to a driving crank, not shown, of any suitable reduction gearing indicated generally at 238, and secured to the undersurface of the stationary frame 210 of the crib. This reduction gearing is directly actuated by an electric motor 240, from any suitable power source by means of a cable 242, whereby upon actuation of the electric motor, the reduction gearing operates the connecting rod 230 at a reduced rate of speed and hence, rocks or oscillates the crib.

This embodiment has the advantage over the spring motor embodiment in that it is automatically operable for a longer period of time without any attention, but it has the disadvantage that it requires a source of electric current to operate the same.

An alternative manner of connecting the reduction gearing 238 to the operating arm 230 is indicated in Figure 5. Here, the operating arm 230 is pivotally mounted as at 250 to the power portion of the framework 210 of the crib, and its upper end is pivoted as at 252 to the upper part of the crib 212. The lower end of the arm 230 is pivoted as at 232 to the connecting rod 234 as in the preceding embodiment. Here however, the electric motor is mounted beneath the supporting frame 210, but to one side thereof, rather than upon the longitudinal center line thereof, while the crank arm 236 is secured to the end plate of the crib 212 along the center line thereof, instead of at the side of the crib. The operation of this form of the device, however, is identical with that of the preceding embodiment.

Wherever deemed desirable, a guide or brace means may be connected with the framework and the crib to minimize or prevent a twisting motion of the crib during its rocking, which twisting might tend to arise because of the application of the oscillatory or rocking drive at one end of the crib. Any suitable means might be provided for this purpose, one form of such means being indicated in Figures 1, 2 and 5 of the drawings.

The illustrated arrangement includes flexible metallic strips terminally secured to the framework and to the corners of the crib opposite that where the driving thrust is imparted. Thus, in Figure 1, a pair of strips 175 are terminally fastened at 177 and 179 respectively to the framework sides adjacent the crank lever 28 and to the opposite corners of the crib respectively.

In the embodiment of Figures 2 and 5, similar strips 275 are secured at 277 and 279 respectively in the same manner.

The strips, framework and crib thus define a parallelogram or parallel bar linkage preventing or minimizing twisting of the crib, tending to restrain the crib to parallel positions during its rocking.

From the foregoing, it is thought that the manner of operating and constructing the device, the principles thereof, and the advantages pertaining thereto will be readily understood and further explanation is believed to be unnecessary. However, since numerous modifications and equivalents will readily occur to those skilled in the art after a consideration of the accompanying drawings and attached specification, it is not intended to limit this invention to the exact construction shown and described, but all suitable modifications and equivalents may be resorted to falling within the scope of the appended claims.

Having described the invention what is claimed as new is:

1. In a spring motor for rocking cradles and having a torsion spring and a ratchet wheel connected therewith, an escapement mechanism comprising a stationary support, a ratchet stop dog pivoted on said support, a lever pivoted on said support and having a ratchet driving dog pivoted thereto, an escapement plate pivoted on said support and connected with said lever and said support, dog actuating means on said escapement plate for actuating said dogs selectively into and out of engagement with said ratchet wheel, said escapement plate being provided with a pair of arcuate slots, a stop pin on said support movable in one slot and an actuating pin on said lever movable in the other slot.

2. The combination of claim 1 wherein each dog has a release finger, actuating flanges on said escapement plate for actuating engagement with said fingers for releasing said dogs from said ratchet wheel.

OLOF CARLSON.

REFERENCES CITED

The following references are of record in the file of this patent:

UNITED STATES PATENTS

| Number | Name | Date |
|---|---|---|
| 459,708 | Lund et al. | Sept. 15, 1891 |
| 579,256 | Bukolt | Mar. 23, 1897 |
| 579,323 | Froehlich | Mar. 23, 1897 |
| 746,166 | Robinson | Dec. 8, 1903 |
| 1,132,432 | Brzozowski | Mar. 16, 1915 |
| 1,170,760 | Koperski | Feb. 8, 1916 |
| 1,342,857 | Magidson | June 8, 1920 |
| 1,549,648 | Ziemianski | Aug. 11, 1925 |
| 2,531,858 | Miller | Nov. 28, 1950 |